(12) United States Patent
Manera et al.

(10) Patent No.: US 11,504,684 B2
(45) Date of Patent: Nov. 22, 2022

(54) HOTPLATE STIRRER

(71) Applicant: OHAUS Corporation, Parsippany, NJ (US)

(72) Inventors: Michael D. Manera, Clayton, NJ (US); Stephen J. Krupsky, Haddon Heights, NJ (US); Tracey A. Hill, West Deptford, NJ (US); Stephen E. Reagoso, Browns Mills, NJ (US); Teri G. Trefz, Lumberton, NJ (US)

(73) Assignee: OHAUS Corporation, Parsippany, NJ (US)

( * ) Notice: Subject to any disclaimer, the term of this patent is extended or adjusted under 35 U.S.C. 154(b) by 372 days.

(21) Appl. No.: 16/587,672

(22) Filed: Sep. 30, 2019

(65) Prior Publication Data
US 2021/0094006 A1   Apr. 1, 2021

(51) Int. Cl.
*B01F 13/04* (2006.01)
*B01L 7/00* (2006.01)
(Continued)

(52) U.S. Cl.
CPC ............ *B01F 35/60* (2022.01); *B01L 7/00* (2013.01); *B01F 35/2115* (2022.01); *B01F 35/2215* (2022.01)

(58) Field of Classification Search
CPC ....... A47J 36/24; F24C 7/083; B01F 13/0818; B01F 35/2205; B01F 35/60
See application file for complete search history.

(56) References Cited

U.S. PATENT DOCUMENTS

| 5,834,739 A | 11/1998 | Lockwood et al. |
| 7,075,040 B2 | 7/2006 | McFadden et al. |

(Continued)

FOREIGN PATENT DOCUMENTS

| CN | 203084503 U | 7/2013 |
| CN | 206315751 U | 7/2017 |

(Continued)

OTHER PUBLICATIONS

Ika-Werke GMBH & Co. KG, RET control-vise The Magnetic Stirrer for Scientists, accessed online Jun. 24, 2019 at https://www.ika.com/ika/pdf/flyer-catalog/RETcontrol-visc_brochure_EN_IWS_web_spread.pdf, pp. 1-20.

(Continued)

*Primary Examiner* — Elizabeth Insler
(74) *Attorney, Agent, or Firm* — Standley Law Group LLP; Jeffrey S. Standley; Stephen L. Grant

(57) ABSTRACT

A hotplate device has a body with a platform for receiving a vessel that contains a sample to be heated. A heating element, arranged under the platform, provides heat to the platform, based on a set temperature and a measured temperature as sensed by at least one temperature sensor, proximate to the platform. A controller located in the body directs electrical power to the heating element. As a safety feature, a wireless communication feature allows a user to enter set temperature instructions from a mobile device when communication with the mobile device is enabled and established. A proximity feature, when enabled, allows the user to enter instructions only as long as the user remains in a predetermined proximity of the hotplate device.

10 Claims, 4 Drawing Sheets

(51) Int. Cl.
*B01F 35/60* (2022.01)
*B01F 35/21* (2022.01)
*B01F 35/221* (2022.01)

(56) References Cited

U.S. PATENT DOCUMENTS

| | | | |
|---|---|---|---|
| 8,574,512 | B2 | 11/2013 | Eble |
| 9,557,249 | B2 | 1/2017 | Ljungmann et al. |
| 10,293,315 | B2 * | 5/2019 | Eble .................... G06F 8/34 |
| 2016/0319354 | A1 | 11/2016 | Tocigl et al. |

FOREIGN PATENT DOCUMENTS

| | | | | |
|---|---|---|---|---|
| DE | 102012215330 | A1 | | 8/2013 |
| DE | 102017003478 | B3 | | 8/2018 |
| EP | 2661994 | A1 | * | 11/2013 ............ G05D 23/22 |
| EP | 2661994 | A1 | | 11/2013 |
| WO | 2017/025984 | A1 | | 2/2017 |

OTHER PUBLICATIONS

Labtech S.R.L., Hotplates, accessed online Jun. 24, 2019 at http://www.labtechsrl.com/images/labtech/products/hotplate/HotPlates.pdf, 7 pages.
Midrack, R. L., Lifewire, Smart Technology for Your Oven and Stove, accessed online Jun. 24, 2019 at https://www.lifewire.com/smart-oven-range-4159902, Dec. 8, 2018, 5 pages.
Selectscience, Remote Control for Magnetic Stirrers by Wheaton, accessed online Jun. 24, 2019 at https://www.selectscience.net/products/remote-control-for-magnetic-stirrers/?prodID=84400, 2019, 2 pages.
Velp Scientifica, AREX-6 Connect Pro, Advanced Hot Plate Stirrer with Wi-Fi, accessed online Jun. 24, 2019 at https://www.velp.com/euronet/contenuti/image/thumb/AREX_6_Connect_PRO_leaflet_rev0.5.pdf, Aug. 2018, 3 pages.
VWR, VWR hotplates, stirrers and hotplate-stirrers, May 4, 2011, 4 pages.
WMG, The University of Warwick, Smart Stirrer, accessed online Jun. 24, 2019 at https://warwick.ac.uk/fac/sci/wmg/education/internships/wmg_research_internships/projects/dmitryisakov/, Jan. 24, 2019, 2 pages.

* cited by examiner

HOTPLATE STIRRER

CROSS-REFERENCE TO RELATED APPLICATIONS

This application makes no claim of priority to any prior patent application.

TECHNICAL FIELD

This invention relates to the field of laboratory equipment provided with safety accessories, and in particular to a laboratory device for heating and/or stirring a liquid, where an active link to a remote mobile device is required to start or maintain operation of the laboratory device. A further aspect of the invention involves features that prevent unattended operation of the device.

BACKGROUND ART

In many laboratory situations, it is necessary to heat and/or stir a liquid contained in a vessel, typically a beaker. It is known and conventional to combine these functionalities into a single device. One such device, as described in U.S. Pat. No. 5,834,739, to Lockwood, has a plate to support the vessel, at least one heating element positioned below the plate and a means for stirring. In Lockwood '739, this means is taught as a motor, located below the plate, which rotates a magnetic element, generating a magnetic field above the plate. When another magnetic element, generally referred to as a magnetic stir rod, is placed in the vessel, it will couple with the magnetic field and rotate, stirring the liquid in the vessel. Typically, the stir rod is coated in a chemically non-reactive polymeric material, such as a poly(tetrafluoroethylene) ("PTFE"), which is sold under the registered trademark TEFLON.

U.S. Pat. No. 7,075,040, to McFadden, teaches a stirring hotplate for laboratory use, using a magnetic stir rod of the type described above. The primary focus of the teaching is a method and device which allows a user to rapidly brake the motor that drives the magnetic element, so that one liquid-containing vessel on the hotplate can be interchanged with a second liquid-containing vessel without needing to reset the stirrer setpoint. An unrelated second feature taught is a "hot surface" feature that is displayed on the device, especially on a display portion, even after power to the unit is turned off.

In other embodiments, the stirring means is a motorized stirring rod that is placed in the vessel. In many of these latter situations, the motor that drives the stirring rod will be powered via a power plug located in the hotplate device, although that is not required.

U.S. Pat. No. 8,574,512, to Eble, teaches that economics of producing a number of different laboratory devices having different functions and/or ranges of performance may be best achieved by building a base unit that is useful for all possible variations when accompanied by one of a plurality of different "remote control" units, although the latter may be better described as "detachable" control units.

U.S. Pat. No. 10,293,315, also to Eble, modifies the stir rod as taught by Lockwood '739 by incorporating a Surface Acoustic Wave ("SAW") sensor having an antenna associated with it. When located near the surface of the stir rod, the SAW sensor can determine the temperature of the stir rod on the basis of piezoelectric effect, using only energy generated by the magnetic field. The antenna can transmit a temperature-related signal to a receiver that receives and converts the signal into a temperature reading, which can be displayed or used by a controller. Eble '315 at least briefly discusses the concern with allowing an unattended hotplate stirrer to continue to heat the vessel after moist or all of the liquid has boiled away.

It is, however, an unmet object of the known prior art to provide a combined hotplate/stirrer device where operation of the device requires an authorized operator to be, and remain, in the proximity of the device during operation.

SUMMARY

These and other objects of the invention are achieved by a heating device, comprising a body, a platform for receiving a vessel, object, or sample to be heated, a heating element, a first temperature sensor, arranged proximate to the platform, at least one controller, located in the body and arranged to receive a temperature signal from the first temperature sensor, for controlling an amount of electrical power supplied to the heating element; and a wireless communication device In some embodiments the wireless communication device which enables a mobile device is located within a communication range of the device, to communicate bidirectionally. In some of these, the wireless communication device provides a signal to not allow completion of the circuit supplying electrical power to the heating element, unless communication with a mobile device has been established. In some of these, the wireless communication device provides a signal to break the circuit supplying electrical power to the heating element, if a break of an established wireless communication with the mobile device occurs.

Other embodiments also comprise a sensor, mounted in the body and in communication with the controller, such that a failure to sense a user within a range of the sensor sends a signal to the controller to break the circuit supplying electrical power to the heating element. In these, the controller, in the absence of a response from a user to the warning signal after a predetermined time, breaks the circuit supplying electrical power to the heating element.

In some embodiments, the device also comprises a motor, arranged in the body to rotate a magnetic element below the platform, generating a magnetic field to couple with a magnetic stir rod in the vessel, such that electrical power provided to the motor, regardless of whether the wireless communication device is connected to a mobile device.

The mobile device can be a smart phone, a tablet computer, a dedicated remote control unit or another equivalent.

In some embodiments, the device further comprises at least one further temperature sensor, configured as a temperature probe in the sample, providing a temperature signal to the controller.

In many of the devices, the at least one controller is programmed with instructions to implement the safe delivery of electrical power to the heating element, the instructions comprising the operations of:

initializing the system;

displaying a set value and a measured value of the heating element;

detecting a user command to deliver electrical power to drive the heating element to the set temperature;

determining whether a wireless communication feature allowing user commands from a mobile device is enabled and connected;

determining whether a feature requiring presence of the user within proximity of the hotplate device is enabled and detecting the user; and terminating the delivery of electrical power to the heating element upon either or both of: a loss of connection to the mobile device and a failure of detecting the presence of the user.

BRIEF DESCRIPTION OF THE DRAWINGS

A better understanding of the invention will be obtained by a review of the appended drawings, wherein identical parts are identified with identical reference numbers and wherein.

DETAILED DESCRIPTION OF THE EMBODIMENTS

Figure 1:
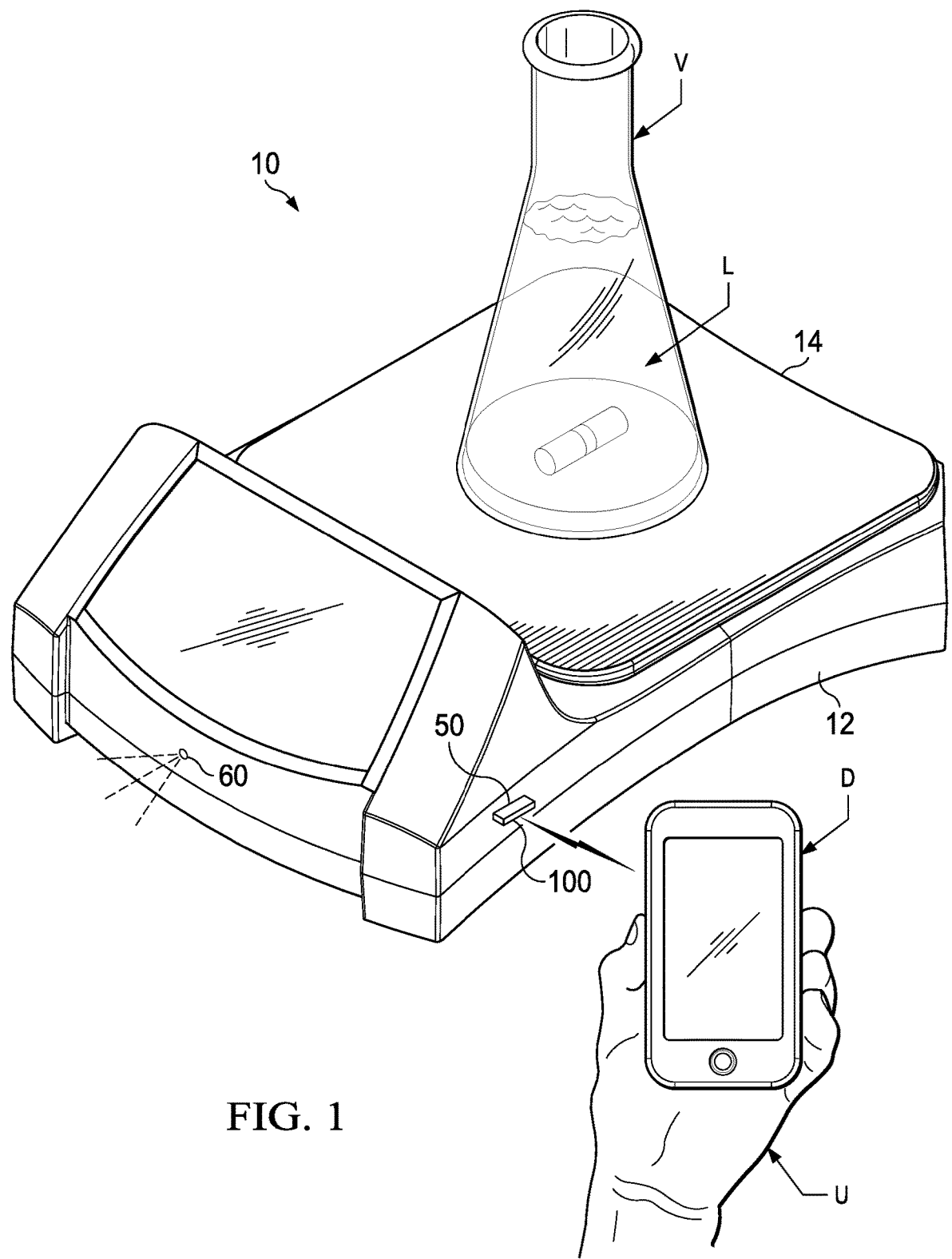
FIG. 1 is a schematic depiction of a laboratory device embodying the inventive concept.

The embodiments that exemplify the inventive concept covered by the appended claim will vary, but in the most basic form, the inventive concept is applied to a laboratory device 10 comprising a body 12 with a platform 14 (also referred to as the "top plate") mounted on the body to receive a vessel V with a liquid L to be heated. As shown in perspective view in FIG. 1, the device 10 will be typically be self-contained, although there is an increasing trend in the industry to allow remote control of the features of the device. In many cases, the remote control may be redundant to controls on the device, but the remote control may be the sole control.

At the minimum, the body 12 will contain a heating element under the platform 14 as well as a controller, typically a microprocessor, to control the amount of electrical power being provided through a power source to the heating element. Many of the embodiments of the device 10 will also be provided with an electrical motor positioned to rotate a magnetic element below the platform, generating a magnetic field above the platform. When coupled with a magnetic stir rod located in the vessel V placed on the platform 14, the rotation of the stir rod can set up a vortex in the liquid L in the vessel, distributing the heat received by the bottom of the vessel. As with the heating element, a controller, and preferably the same controller that controls power to the heating element, is used to control the power provided to the electric motor that rotates the magnetic element. By providing individual inputs to the controller(s), the power to the heating element and to the motor can be controlled individually. To this extent, the typical device 10 to which the inventive concept can be applied can operate as a hot plate, as a stirrer, or as a hotplate stirrer.

In preferred embodiments, the platform 14 will be provided with a temperature sensor that provides an input signal to the controller(s) so that a "hot surface" display will be illuminated as long as predetermined temperature threshold is exceeded. This sensor and hot surface indicator will preferably continue to function if the power to the heating element is turned off, at least a limited period of illumination. The inventive concept described herein is effectively independent of the "hot surface" display, although it may have access to the input from the temperature sensor.

The device 10 will be provided with a standard plug for connection to a socket providing the locally-available electrical power. It will also be provided with a standard and conventional "on/off" switch on the body 12. However, a first aspect of the inventive concept is to provide a wireless communication device 100, such as a BLUETOOTH device, which could be included within body 12 or connected to port 50, such as a Universal Serial Bus ("USB") port, on the body 12, with the connection port in electrical communication with the controller(s). In this first aspect, operation of the device 10 would terminate electrical power to the heating element with loss of communication with a mobile device, regardless of the status of the "on/off" switch. In a further, and preferred aspect of the invention, unless and until this wireless feature is successfully linked to a mobile device D of a user U, electrical power to the heating element is terminated. While the optional BLUETOOTH feature provides a first assurance of an authorized user, the range of a wireless device may be too large to be the sole manner of monitoring an attendant user. Using BLUETOOTH as an example, there are three "classes" of BLUETOOTH wireless technology. The majority of BLUETOOTH devices are the "Class 2" devices that operate at 2.5 mW, with a range of up to about 10 m. A "Class 1" BLUETOOTH device, operating at 100 mW has a range of up to about 100 m. Either of these would seem to be acceptable, but the Class 1 version would probably be considered to have too large of an operational range for the purpose. A "Class 3" version of BLUETOOTH, operating with a 1 mW power, has a range of less than 10 m. It is believed that it would probably have too limited of a range to provide the desired monitoring of the user.

A further manner of providing an assurance of an attendant user is provided by a proximity sensor 60 in the body 12. This type of sensor 60 typically operates by sensing the infrared (IR) radiation emitted by a user, so it can be used to determine if there is at least one user within a predetermined proximity distance, so the heater will not be operating in an unattended manner.

Figure 2:
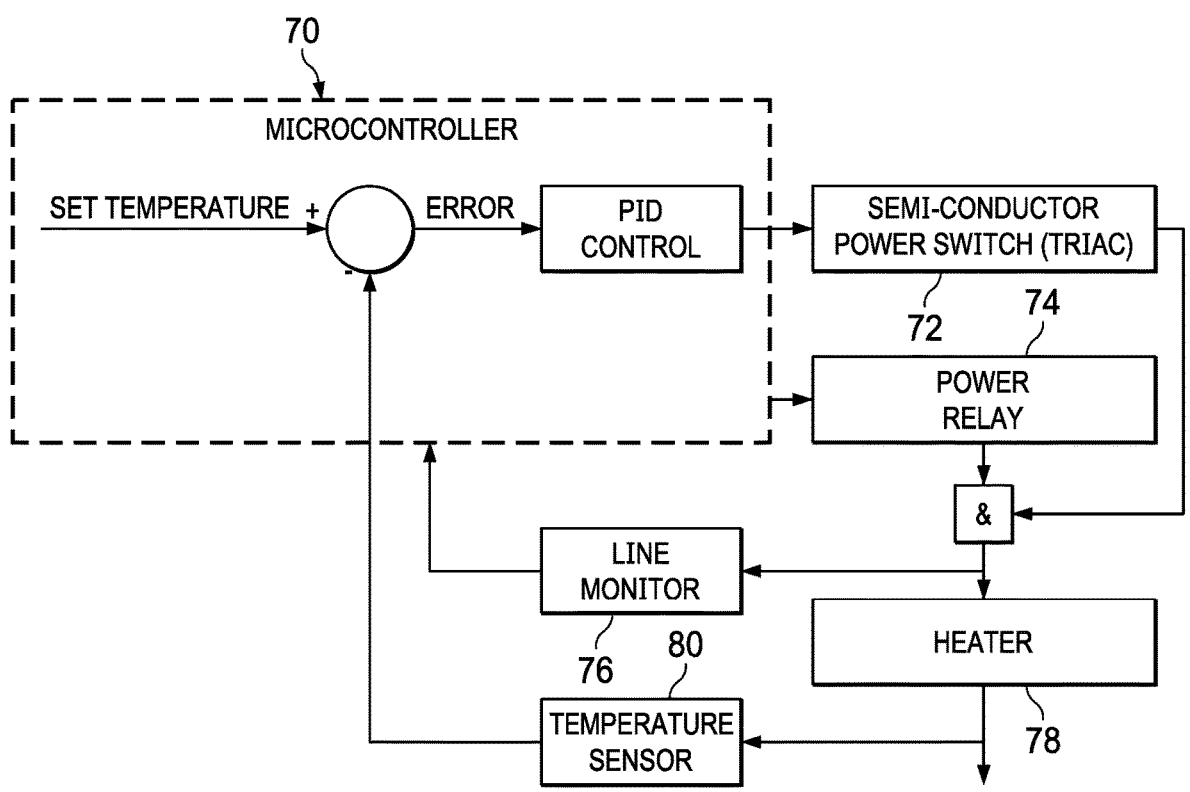
FIG. 2 is a power diagram schematically depicting how control of the electrical power to a heating element of the laboratory device 10 is regulated, internal to the body of the device.

FIG. 2 is a power diagram that shows how power to a heating element of the laboratory device 10 is regulated. Using conventional control elements, a user provides a set temperature to a microcontroller 70 that contains a computer program with instructions to perform the algorithm detailed in FIG. 3A and FIG. 3B. Using an output signal of the microcontroller 70, a semi-conductor power switch 72, preferably a TRIAC, and a power relay 74, controls supply of electrical power, which is monitored by a line monitor 76, to the heater element 78, preferably located within the platform 14 of FIG. 1. Temperature feedback to the microcontroller 70 is provided by at least one temperature sensor 80. A first, or primary, temperature sensor is preferably located within the platform 14, but it would not be uncommon to have a secondary temperature sensor that would amount in many cases to a thermocouple that is insertable into the liquid being heated.

Figure 3A:
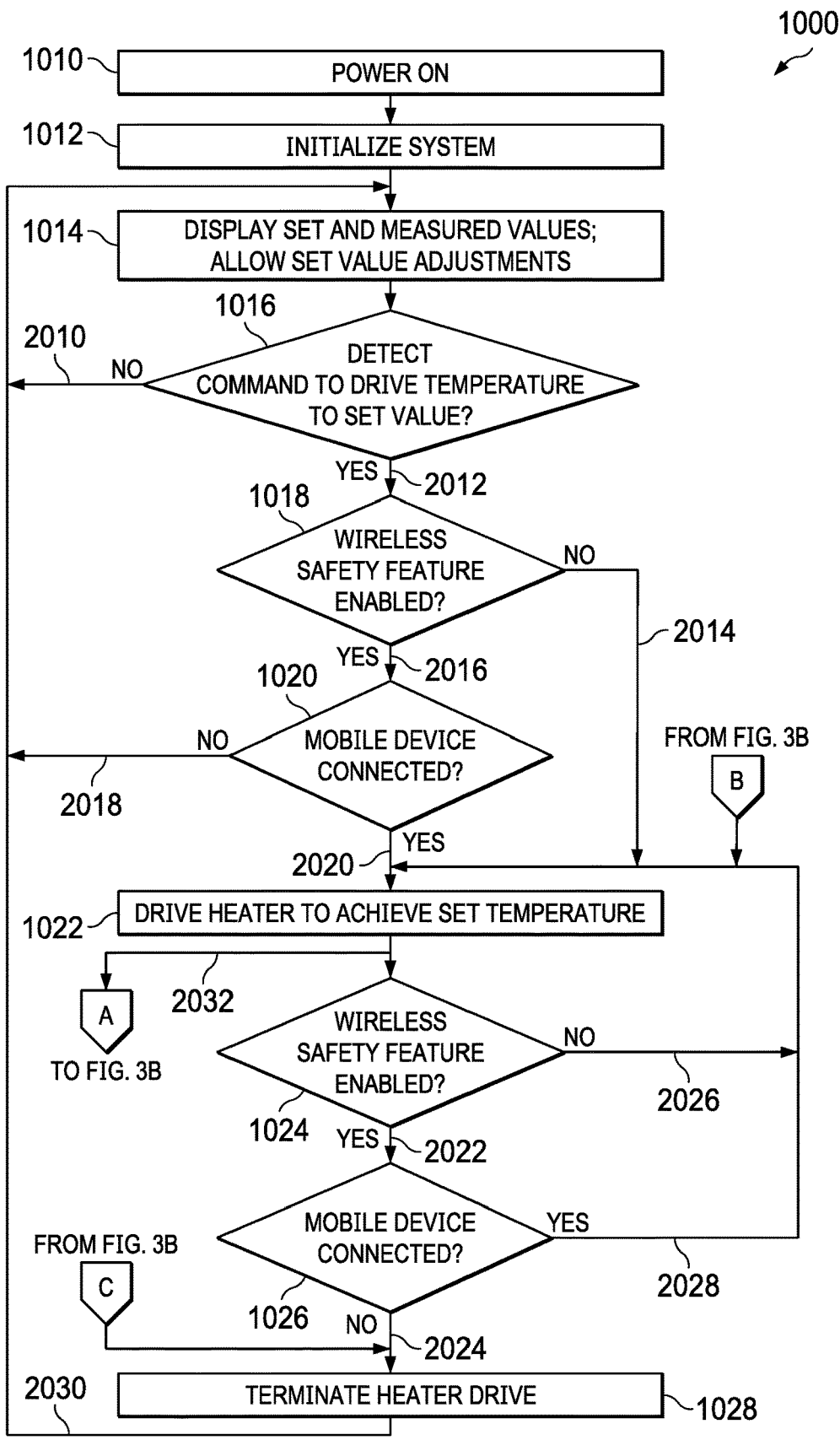
FIGS. 3A and 3B are a flow diagram that depicts an exemplary algorithm for controlling the laboratory device according to the inventive concept.
Figure 3B:
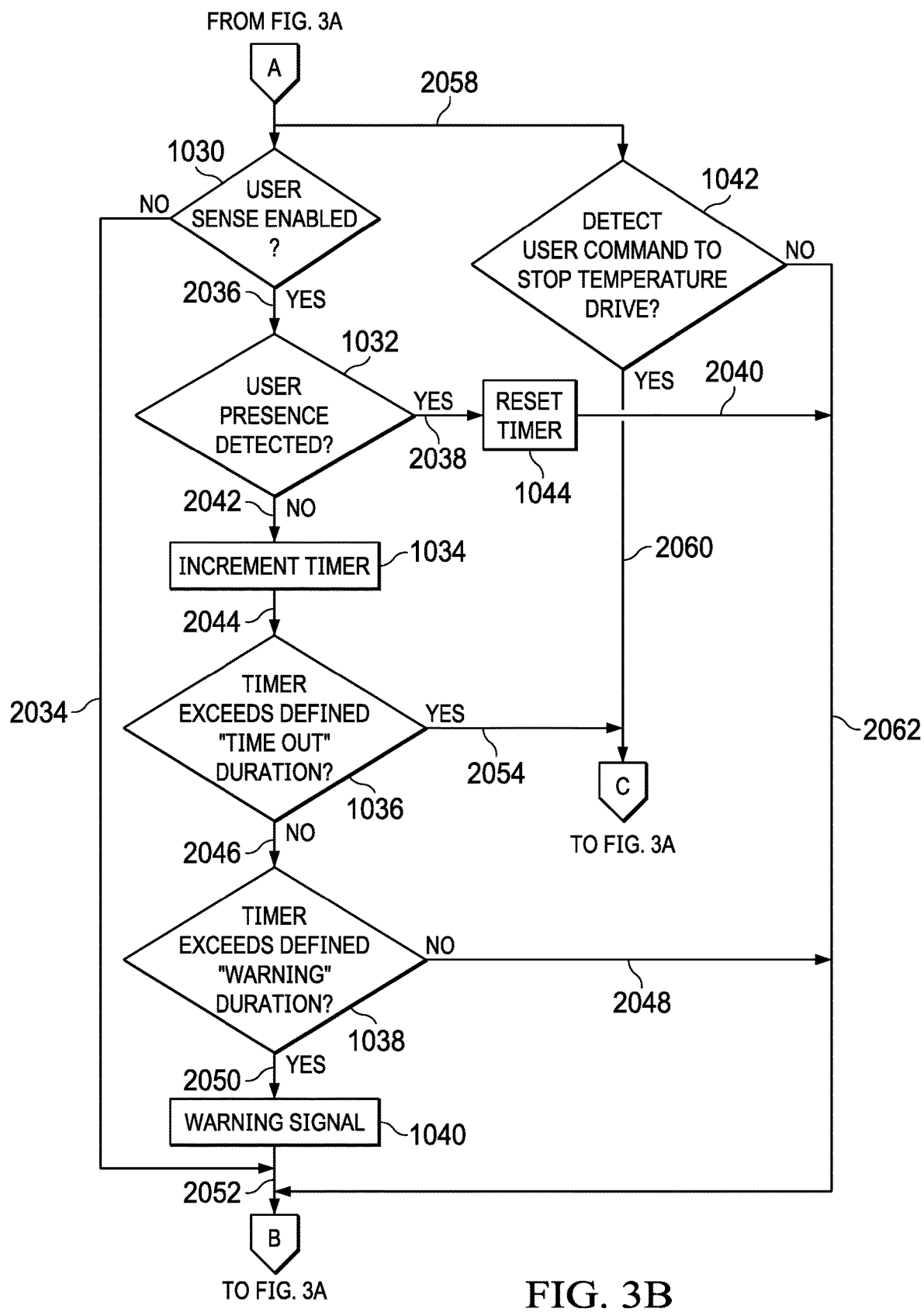

FIG. 3, which is divided into FIG. 3A and FIG. 3B, provides the flow diagram 1000 of an algorithm under which the laboratory device 10 is operated under the inventive concept. Under step 1010, the power to the laboratory device 10 is enabled, typically with an "on/off" switch on the device. Once the power is on, the system operation in the controller is initialized, at step 1012, followed by displaying set and measured values and permitting set values to be changed by a user, as indicated at step 1014. At this point, shown as decision point 1016, the controller determines if a command to drive the temperature to the set value is detected. If no command is detected, path 2010 redirects to step 1014 and this loop is iterated until a command is detected.

However, if a command to drive the temperature to the set value is detected at decision point 1016, then path 2012 directs the control system to decision point 1018, where it looks to see if the wireless safety feature has been enabled. The wireless safety feature is the detection of a user with a mobile device having ability to provide control signals to the device 10. If the wireless safety feature is not enabled, path 2014 directs the controller to step 1022, where a user will be able to operate the device 10.

If the wireless safety feature is enabled, path 2016 leads to decision point 1020, where the issue is whether a mobile device able to communicate wirelessly with the device 10, is connected. If there is no mobile device connected, path 2018 leads back to step 1014 for an iterative loop until the wireless safety feature is disabled or a mobile device is connected.

If decision point 1020 determines that a mobile device is connected, then path 2020 takes the algorithm to step 1022, where the heater will be driven to achieve the set temperature. This set temperature may be entered either on the device itself (by entry through path 2014) or through a wireless communication with a mobile device (by entry through path 2020).

At this point also, the algorithm begins to operate under two nested loops. In a first of these loops, decision point 1024, like decision point 1018, will inquire as to whether the wireless safety feature is enabled. If the answer is "yes", path 2022 will go to decision point 1026, which is like decision point 1020, to inquire that the mobile device is connected. If connection is lost, path 2024 will lead to step 1028 and the drive power to the heater will be terminated. Notably, termination of the heater drive power at step 1028 iterates back to step 1014, by way of path 2030.

If the wireless safety feature is no longer enabled (path 2026) or if the mobile device is still connected (path 2028), operation of the heater by the controller is still allowed and both paths iterate back to step 1022. This first loop, in other words, checks on the continuing ability of the controller to receive instructions from a mobile device that has established a connection, or it allows a manual operation on the device to continue.

The second loop that proceeds from step 1022 is related to the feature that requires physical presence of a user in order for drive power to be supplied to the heater. In FIG. 3A, this is shown as path 2032, which leads to point A on FIG. 3B, which is where the operation of the second loop is depicted. From point A, decision point 1030 inquires if the "user sense" feature is enabled. In other words, is the proximity sensor operational? If it is not, path 2034 redirects the controller to point B, where control returns to point B on FIG. 3A and path 2020, where step 1022 is repeated. If the proximity sensor is enabled, path 2036 goes to decision point 1032, where the proximity sensor is asked if a user presence is detected. If a user is detected, path 2038 goes to point 1034, where a "user absent" timer is reset to "0" and path 2040 leads back to step 1022 on FIG. 3A, allowing continued control of the drive power to the heater.

If the inquiry at decision point 1032 results in a determination of "no user present, path 2042 leads to step 1044 and the "user absent" timer is incremented. After this occurs, path 2044 leads to decision point 1036 and the timer is asked whether it has exceeded a predetermined "time out" limit. If it has not, the user remains in control and path 2046 and, at decision point 1038, the timer is asked whether a predetermined "warning" duration has been exceeded. If the elapsed time is still less than the warning limit, path 2048 leads with point B, and the control algorithm returns to step 1022, with the user still in control. If the inquiry at decision point 1038 results in a response that the "warning" limit has been exceeded, then path 2050 leads to step 1040, causing a warning signal on device 10 and/or to go to the user at the mobile device. From there, control goes, through path 2052, to point B, which goes back to step 1022 on FIG. 3A.

Back at decision point 1036, if the inquiry results in a signal that the predetermined "time out" duration has been exceeded, the absence of a user for the time out limit sends control, by way of path 2054, to point C on FIG. 3A, where it is seen that path 2056 will lead to step 1028, terminating the drive power to the heater and looping control back to step 1014 through path 2030.

Any time that control moves from point A on FIG. 3A to FIG. 3B, there is also another decision that is made. Decision point 1042, reached through path 2058, looks at the points where user control can originate to see if a command to stop drive power to the heater is present. If such a command is present, path 2060 goes to point C, returning the algorithm to point C on FIG. 3A, where step 1028 terminates heater drive power and loops the algorithm back to step 1014 through path 2030. If no user command to stop drive power is detected, then operation may continue and path 2062 leads to point B on FIG. 3A, where step 1022 continues to allow drive power as needed to achieve the set temperature.

What is claimed is:

1. A heating device, comprising:
  a body;
  a platform for receiving a vessel, object, or sample to be heated;
  a heating element;
  a circuit, supplying electrical power to the heating element;
  a first temperature sensor, arranged proximate to the platform;
  at least one controller, located in the body and arranged to receive a temperature signal from the first temperature sensor, for controlling an amount of electrical power supplied to the heating element by the circuit;
  a wireless communication device that enables bidirectional communication with a mobile device, located within a communication range of the heating device, wherein the wireless communication device provides a signal to not allow completion of the circuit supplying electrical power to the heating element, unless communication with the mobile device has been established;
  an infra-red sensor, mounted in the body and in communication with the controller, such that a failure to sense a user within a range of the sensor sends a signal to the controller to break the circuit supplying electrical power to the heating element; and
  a motor, arranged in the body to rotate a magnetic element below the platform, generating a magnetic field to couple with a magnetic stir rod in the vessel, such that electrical power is provided to the motor, regardless of whether the wireless communication device is connected to a mobile device.

2. The heating device of claim 1, wherein:
  the wireless communication device provides a signal to break the circuit supplying electrical power to the heating element, if a break of an established wireless communication with the mobile device occurs.

3. The heating device of claim 1, wherein:
the controller, in the absence of a response from a user to a warning signal after a predetermined time, breaks the circuit supplying electrical power to the heating element.

4. The heating device of claim 1, wherein the mobile device is a smart phone.

5. The heating device of claim 1, wherein the mobile device is a tablet computer.

6. The heating device of claim 1, wherein the mobile device is a dedicated remote control unit.

7. The heating device of claim 1, further comprising:
at least one further temperature sensor, configured as a temperature probe in the sample, providing a temperature signal to the controller.

8. The heating device of claim 1, wherein:
the at least one controller is programmed with instructions to implement the safe delivery of electrical power to the heating element, the instructions comprising the operations of:
   initializing the heating device;
   displaying a set value and a measured value of the heating element;
   detecting a user command to deliver electrical power to drive the heating element to the set temperature;
   determining whether a wireless communication feature allowing user commands from a mobile device is enabled and connected;
   determining whether a feature requiring presence of the user within proximity of the hotplate device is enabled and detecting the user; and
   terminating the delivery of electrical power to the heating element upon either or both of: a loss of connection to the mobile device and a failure of detecting the presence of the user.

9. A device for heating and stirring a liquid contained in a vessel, comprising:
a body;
a platform for receiving the vessel to be heated;
a heating element;
a circuit, supplying electrical power to the heating element;
a first temperature sensor, arranged proximate to the platform;
at least one controller, located in the body and arranged to receive a temperature signal from the first temperature sensor, for controlling an amount of electrical power supplied to the heating element by the circuit;
a motor, arranged in the body to rotate a magnetic element below the platform, generating a magnetic field to couple with a magnetic stir rod in the vessel, such that electrical power is provided to the motor, regardless of whether the wireless communication device is connected to a mobile device;
an infra-red sensor, installed in the body to detect the presence of a user within a predetermined proximity distance and provide a signal to the at least one controller when the infra-red sensor is enabled; and
a wireless communication device that enables bidirectional communication with a mobile device, located within a communication range of the heating device, wherein the wireless communication device provides a signal to the at least one controller when the bidirectional communication is enabled;
wherein the at least one controller is programmed with instructions to implement the safe delivery of electrical power to the heating element, the instructions comprising the operations of:
   initializing the heating device;
   displaying a set value and a measured value of the heating element to the mobile device;
   detecting a user command from the mobile device to deliver electrical power to drive the heating element to the set temperature;
   determining whether a wireless communication feature allowing user commands from a mobile device is enabled and connected;
   determining whether the infra-red detector is enabled and detecting the user; and
   terminating the delivery of electrical power to the heating element upon either of: loss of connection of the wireless communication from the mobile device, or failure to detect the presence of the user.

10. The device for heating and stirring liquid contained in a vessel of claim 9, wherein the step of terminating delivery of electrical power to the heating element occurs only after a predetermined warning period is exceeded without user response.

* * * * *